United States Patent
Gao et al.

(10) Patent No.: US 11,838,503 B2
(45) Date of Patent: Dec. 5, 2023

(54) VIDEO PROCESSING METHOD AND APPARATUS, STORAGE MEDIUM, AND ELECTRONIC DEVICE

(71) Applicant: TENCENT TECHNOLOGY (SHENZHEN) COMPANY LIMITED, Guangdong (CN)

(72) Inventors: Xinwei Gao, Guangdong (CN); Weiran Li, Guangdong (CN); Xunan Mao, Guangdong (CN); Chenchen Gu, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 311 days.

(21) Appl. No.: 17/449,109

(22) Filed: Sep. 28, 2021

(65) Prior Publication Data
US 2022/0014737 A1    Jan. 13, 2022

Related U.S. Application Data

(63) Continuation of application No. PCT/CN2020/113981, filed on Sep. 8, 2020.

(30) Foreign Application Priority Data

Sep. 27, 2019 (CN) .......................... 201910927038.6

(51) Int. Cl.
*H04N 19/119* (2014.01)
*H04N 19/117* (2014.01)
(Continued)

(52) U.S. Cl.
CPC ......... *H04N 19/119* (2014.11); *H04N 19/117* (2014.11); *H04N 19/14* (2014.11); *H04N 19/176* (2014.11)

(58) Field of Classification Search
CPC ........................... H04N 19/119; H04N 19/176
See application file for complete search history.

(56) References Cited

U.S. PATENT DOCUMENTS

| 7,956,930 B2 | 6/2011 | Sullivan |
| 8,493,513 B2 | 7/2013 | Sullivan |
| (Continued) | | |

FOREIGN PATENT DOCUMENTS

| CN | 101366281 A | 2/2009 |
| CN | 106157257 A1 | 11/2016 |
| (Continued) | | |

OTHER PUBLICATIONS

International Search Report dated Dec. 14, 2020 Issued in corresponding application PCT/CN2020/113981 (with English translation) citing documents (AA-AJ and AO-AR) 5 pages.

(Continued)

*Primary Examiner* — David N Werner
(74) *Attorney, Agent, or Firm* — ARENTFOX SCHIFF LLP

(57) ABSTRACT

A video processing method is provided. In the method, at least one pair of decoded blocks to be reconstructed in a video frame is determined. Each pair of decoded blocks in the at least one pair of decoded blocks includes a first decoded block of a first resolution and a second decoded block of a second resolution. The first decoded block is adjacent to the second decoded block. The first resolution of the first decoded block is adjusted to a target resolution. The second resolution of the second decoded block is adjusted to the target resolution. A first edge pixel set in the first decoded block is determined. A second edge pixel set in the second decoded block is determined, the second edge pixel set being adjacent to the first edge pixel set. Further, the first edge pixel set and the second edge pixel set are filtered.

20 Claims, 6 Drawing Sheets

(51) Int. Cl.
*H04N 19/14* (2014.01)
*H04N 19/176* (2014.01)

(56) References Cited

U.S. PATENT DOCUMENTS

| | | | |
|---|---|---|---|
| 8,780,272 B2 | 7/2014 | Sullivan | |
| 9,319,729 B2 | 4/2016 | Sullivan | |
| 2006/0245502 A1 | 11/2006 | Cheng et al. | |
| 2007/0160163 A1 | 7/2007 | Sullivan | |
| 2008/0304756 A1* | 12/2008 | Amir | H04N 19/176 |
| | | | 382/232 |
| 2011/0211122 A1 | 8/2011 | Sullivan | |
| 2013/0271651 A1 | 10/2013 | Sullivan | |
| 2014/0136686 A1* | 5/2014 | Tsai | H04L 43/08 |
| | | | 709/224 |
| 2014/0269912 A1 | 9/2014 | Sullivan | |
| 2015/0264406 A1 | 9/2015 | Kim et al. | |
| 2018/0278952 A1* | 9/2018 | Han | H04N 19/27 |
| 2019/0104313 A1* | 4/2019 | Toyoda | H04N 19/36 |
| 2019/0141323 A1 | 5/2019 | Yang et al. | |
| 2022/0078408 A1* | 3/2022 | Park | H04N 19/139 |

FOREIGN PATENT DOCUMENTS

| | | | | |
|---|---|---|---|---|
| CN | 107817385 A | | 12/2017 | |
| CN | 108124154 A | * | 6/2018 | ........... H04N 19/109 |
| CN | 110677690 A | | 1/2020 | |

OTHER PUBLICATIONS

Written Opinion dated Dec. 14, 2020 Issued in corresponding application PCT/CN2020/113981 (4 pages).
Supplementary European Search Report dated Nov. 15, 2022 in Application No. 20868851.5, pp. 1-11.
Yeh C-H et al: "Post-processing deblocking filter algorithm for various video decoders", IET Image Processing, IET, UK, vol. 6, No. 5, Jul. 27, 2012, pp. 534-547.
Amiri Sekine Asadi et al: "Image compression using JPEG with reduced blocking effects via adaptive down-sampling and self-learning image sparse representation", Multimedia Tools and Applications, Kluwer Academic Publishers, Boston, US, vol. 77, No. 7, May 12, 2017, pp. 8677-8693.

* cited by examiner

US 11,838,503 B2

VIDEO PROCESSING METHOD AND APPARATUS, STORAGE MEDIUM, AND ELECTRONIC DEVICE

RELATED APPLICATIONS

This application is a continuation of International Application No. PCT/CN2020/113981, entitled "VIDEO PROCESSING METHOD AND APPARATUS, AND STORAGE MEDIUM AND ELECTRONIC DEVICE" and filed on Sep. 8, 2020, which claims priority to Chinese Patent Application No. 201910927038.6, entitled "VIDEO PROCESSING METHOD AND APPARATUS, AND STORAGE MEDIUM" and filed on Sep. 27, 2019. The entire disclosures of the prior applications are hereby incorporated by reference in their entirety.

FIELD OF THE TECHNOLOGY

This application relates to the field of audio and video encoding and decoding, including a video processing method and apparatus, a storage medium, and an electronic device.

BACKGROUND OF THE DISCLOSURE

With the development of digital media technologies and computer technologies, videos are applied to various fields, such as mobile communication, online surveillance, and network television. With the improvement of hardware performance and screen resolution, users have increasing demand for high-definition videos.

At present, in the related art, to save transmission bandwidth, different audio and video frames or different encoding and decoded blocks in the same audio and video frame are encoded and decoded by using different resolutions. When the foregoing audio and video frames or encoding and decoded blocks of different resolutions are reconstructed, it cannot be ensured to restore the original video content due to the inconsistent resolutions, which leads to video distortion.

In view of the foregoing problems, no effective solution has been provided yet.

SUMMARY

A video processing method is provided. In the method, at least one pair of decoded blocks to be reconstructed in a video frame is determined. Each pair of decoded blocks in the at least one pair of decoded blocks includes a first decoded block of a first resolution and a second decoded block of a second resolution. The first decoded block is adjacent to the second decoded block. The first resolution of the first decoded block is adjusted to a target resolution. The second resolution of the second decoded block is adjusted to the target resolution. A first edge pixel set in the first decoded block is determined. A second edge pixel set in the second decoded block is determined, the second edge pixel set being adjacent to the first edge pixel set. Further, the first edge pixel set and the second edge pixel set are filtered.

A video processing method is provided. In the method, at least one pair of encoded blocks to be reconstructed in a video frame is determined. Each pair of encoded blocks in the at least one pair of encoded blocks includes a first encoded block of a first resolution and a second encoded block of a second resolution. The first encoded block is adjacent to the second encoded block. The first resolution of the first encoded block is adjusted to a target resolution. The second resolution of the second encoded block is adjusted to the target resolution. A first edge pixel set in the first encoded block is determined. A second edge pixel set in the second encoded block is determined, the second edge pixel set being adjacent to the first edge pixel set. Further, the first edge pixel set and the second edge pixel set are filtered.

A video processing apparatus is provided. The video processing apparatus includes processing circuitry that is configured to determine at least one pair of blocks to be reconstructed in a video frame. Each pair of blocks in the at least one pair of blocks includes a first block of a first resolution and a second block of a second resolution. The first block is adjacent to the second block. The processing circuitry is configured to adjust the first resolution of the first block to a target resolution and adjust the second resolution of the second block to the target resolution. The processing circuitry is configured to determine a first edge pixel set in the first block and determine a second edge pixel set in the second block, the second edge pixel set being adjacent to the first edge pixel set. The processing circuitry is further configured to filter the first edge pixel set and the second edge pixel set.

One or more non-transitory computer-readable storage mediums are provided. The one or more non-transitory computer-readable storage mediums storing instructions which when executed by one or more processors cause the one or more processors to perform one or more of the processing methods.

An electronic device is provided, including a memory and one or more processors, the memory storing computer-readable instructions, the computer-readable instructions, when executed by the one or more processors, causing the one or more processors to perform one or ore of the processing methods.

BRIEF DESCRIPTION OF THE DRAWINGS

To describe technical solutions in embodiments of this disclosure more clearly, the following briefly introduces the accompanying drawings required for describing the embodiments. The accompanying drawings in the following description show only some embodiments of this disclosure, and a person of ordinary Skill in the art may still derive other drawings from these accompanying drawings.

DESCRIPTION OF EMBODIMENTS

In order to make a person skilled in the art better understand the solutions of this disclosure, the following describes technical solutions in the embodiments of this disclosure with reference to the accompanying drawings in the embodiments of this disclosure. The described embodiments are exemplary and only some of the embodiments of this disclosure rather than all of the embodiments. All other embodiments obtained by a person of ordinary skill in the art based on the embodiments of this disclosure shall fall within the protection scope of this disclosure.

In this specification, the claims, and the accompanying drawings of this disclosure, the terms "first", "second", and so on are intended to distinguish similar objects but do not necessarily indicate a specific order or sequence. It is to be understood that the data termed in such a way are interchangeable in appropriate circumstances, so that the embodiments of this disclosure described herein can be implemented in orders other than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

According to an aspect of the embodiments of this disclosure, a video processing method is provided. For example, in an implementation, the video processing method may be applied to, but is not limited to, a video processing system in an application environment shown in FIG. 1. The video processing system includes a terminal 102 and a server 104. The terminal 102 communicates with the server 104 by using a network. The terminal 102 may be, but is not limited to, a smartphone, a tablet computer, a laptop computer, a desktop computer, or the like, but is not limited thereto. The server 104 may be, but is not limited to, a computer processing device with a strong data processing capability and a certain storage space.

Figure 1:
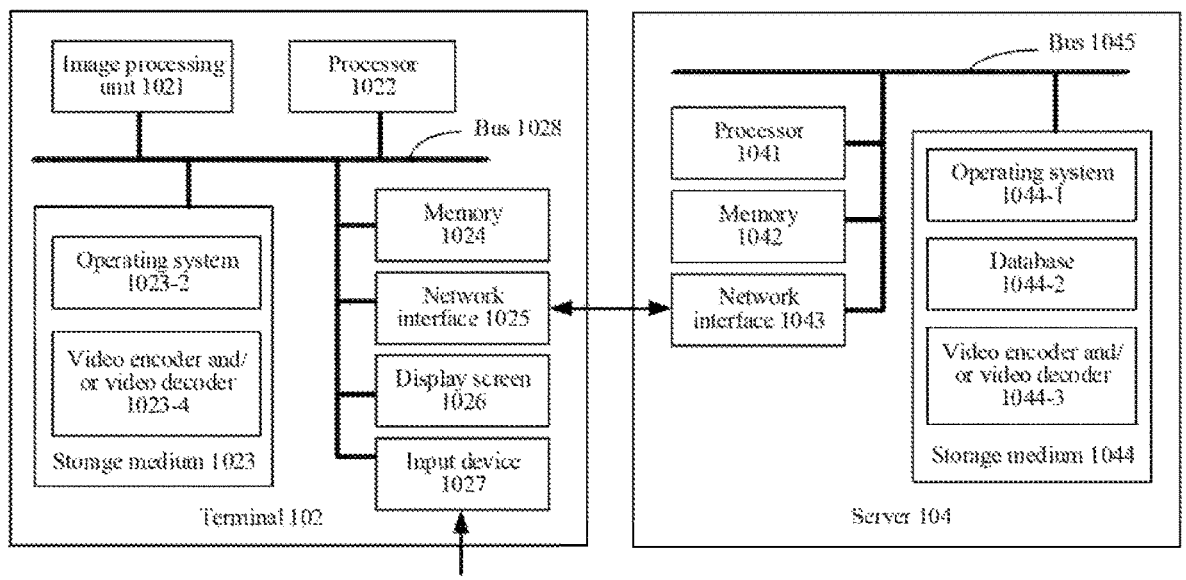
FIG. 1 is a schematic diagram of all application environment of an exemplary video processing method according to an embodiment of this disclosure.

Through an interaction process between the terminal 102 and the server 104 shown in FIG. 1, edge pixel sets with adjacent positions are determined in encoded blocks or decoded blocks with different resolutions and adjacent positions in a video encoding and decoding process, to perform edge filtering on the edge pixel sets, thereby avoiding an obvious seam in reconstructed video frames, and overcoming the problem of video distortion caused by different resolutions in the related art. Further, filtered encoded blocks or decoded blocks can truly restore content in the video frames, and encoding and decoding efficiency can be improved.

In an embodiment, the terminal 102 may include, but is not limited to, the following components: an image processing unit 1021, a processor 1022, a storage medium 1023, a memory 1024, a network interface 1025, a display screen 1026, and an input device 1027. The foregoing components may be connected by using, but is not limited to, a system bus 1028. The image processing unit 1021 is configured to provide at least a drawing capability of a display interface; the processor 1022 is configured to provide computing and control capabilities, to support running of the terminal 102; the storage medium 1023 stores an operating system 1023-2, a video encoder and/or video decoder 1023-4. The operating system 1023-2 is configured to provide control operation instructions, and the video encoder and/or video decoder 1023-4 is configured to perform encoding/decoding operations according to the control operation instructions. In addition, the foregoing memory provides a running environment for the video encoder and/or video decoder 1023-4 in the storage medium 1023, and the network interface 1025 is configured to perform network communication with the network interface 1043 in the server 104. The display screen is configured to display an application interface and the like, for example, decode a video; and the input device 1027 is configured to receive a command, data, or the like entered by a user. For a terminal 102 with a touchscreen, the display screen 1026 and the input device 1027 may be the touchscreen. The internal structures of the terminal shown in FIG. 1 are merely exemplary block diagrams of partial structures related to a solution in this disclosure, and do not constitute a limitation to the terminal to which the solution in this disclosure is applied. For example, the terminal or server may include more components or fewer components than those shown in the figures, or some components may be combined, or a different component configuration may be used.

In an embodiment, the server 104 may include, but is not limited to, the following components: a processor 1041, a memory 1042, a network interface 1043, and a storage medium 1044. The foregoing components may be connected by using, but is not limited to, a system bus 1045. The storage medium 1044 includes an operating system 1044-1, a database 1044-2, a video encoder and/or video decoder 1044-3. The processor 1041 is configured to provide computing and control capabilities, to support running of the server 104. The memory 1042 provides an environment for the running of the video encoder and/or the video decoder 1044-3 in the storage medium 1044. The network interface 1043 communicates with the network interface 1025 of the external terminal 102 by using a network. The operating system 1044-1 in the storage medium is configured to provide control operation instructions; the video encoder and/or video decoder 1044-3 is configured to perform encoding/decoding operations according to the control operation instructions; and the database 1044-2 is configured to store data. The internal structures of the server shown in FIG. 1 are merely exemplary block diagrams of partial structures related to a solution in this disclosure, and do not constitute a limitation to a computer device to which the solution in this disclosure is applied. Other embodiments of the computer device can have different component configurations.

In an embodiment, the foregoing network may include, but is not limited to, a wired network. The wired network may include, but is not limited to, a wide area network, a metropolitan area network, and a local area network. The foregoing description is merely an example, and this is not limited in this embodiment.

Figure 2:
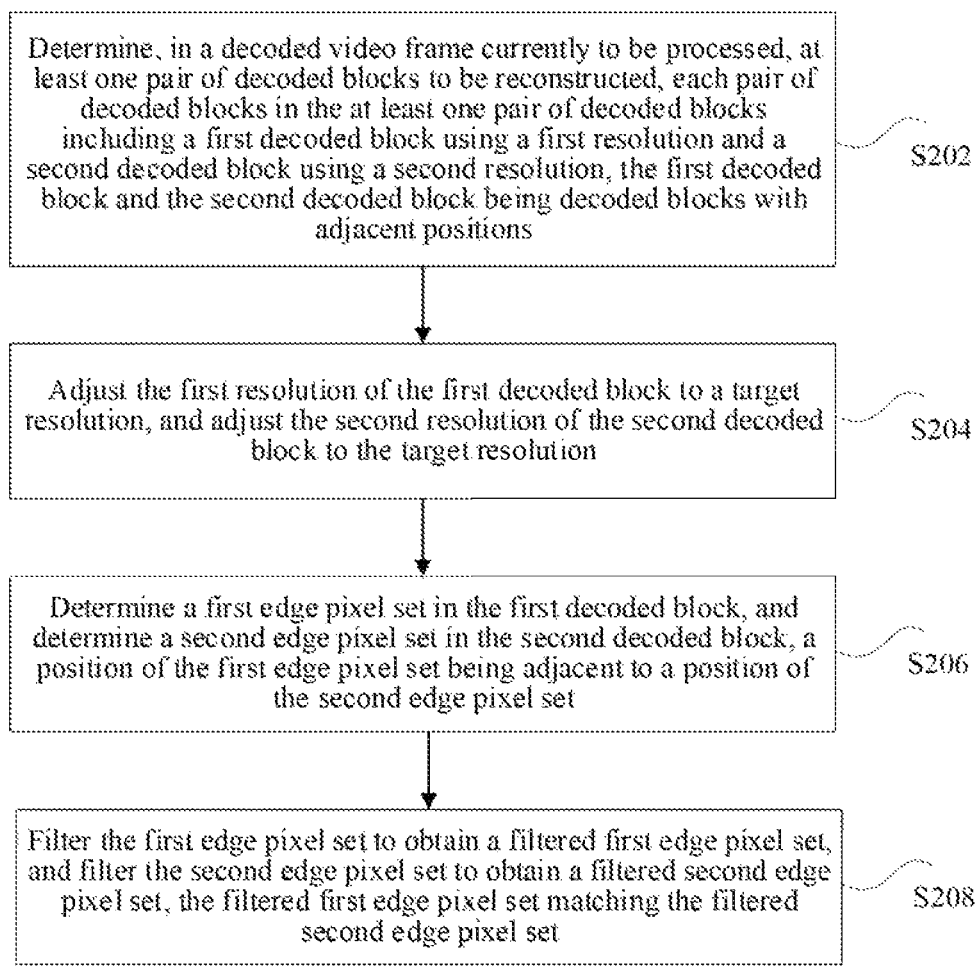
FIG. 2 is a flowchart of an exemplary video processing method according to an embodiment of this disclosure.

In an exemplary implementation, as shown in FIG. 2, the foregoing video processing method may be applied to a decoder side. The method can include the following steps.

In step S202, in a decoded video frame currently to be processed, at least one pair of decoded blocks to be reconstructed is determined, each pair of decoded blocks in the at least one pair of decoded blocks including a first decoded block using a first resolution and a second decoded block using a second resolution, the first decoded block and the second decoded block being decoded blocks with adjacent positions.

In step S204, the first resolution of the first decoded block is adjusted to a target resolution, and the second resolution of the second decoded block is adjusted to the target resolution.

In step S206, a first edge pixel set in the first decoded block is determined, and a second edge pixel set in the second decoded block is determined, a position of the first edge pixel set being adjacent to a position of the second edge pixel set.

In step S208, the first edge pixel set is filtered to obtain a filtered first edge pixel set, and the second edge pixel set is filtered to obtain a filtered second edge pixel set, the filtered first edge pixel set matching the filtered second edge pixel set.

The video processing method shown in FIG. 2 may be used in, but is not limited to, the video decoder shown in FIG. 1. The foregoing video processing procedure can be completed through interaction of the video decoder and other components.

For example, in an embodiment, the video processing method may be applied to, but is not limited to, application scenarios such as video playback applications, video Sharing applications, or video session applications. Videos transmitted in the foregoing application scenarios may include, but are not limited to, long videos and short videos. For example, a long video may be a play episode with a long playback time (e.g., the playback time is greater than 10 minutes), or a picture displayed in a long video session; and a short video may be a voice message exchanged between two or more parties, or a video with a short playback time (e.g., the playback time is less than or equal to 30 seconds) displayed on a sharing platform. The foregoing description is merely an example. The video processing method provided in this embodiment may be applied to, but is not limited to, a playback device configured to play videos in the foregoing application scenarios. After a decoded video frame currently to be processed is obtained, at least one pair of decoded blocks to be reconstructed is determined, each pair of decoded blocks in the at least one pair of decoded blocks including a first decoded block using a first resolution and a second decoded block using a second resolution. The resolution adjustment is performed on the foregoing decoded blocks, and the edge filtering is performed on the edge pixel sets determined in the decoded blocks, to avoid an obvious seam in the video during the reconstruction, thereby overcoming the problem of video distortion in the related art.

For example, in this embodiment, the adjusting the first resolution of the first decoded block to a target resolution, and adjusting the second resolution of the second decoded block to the target resolution can include: adjusting the second resolution to the first resolution when the target resolution is equal to the first resolution; adjusting the first resolution to the second resolution when the target resolution is equal to the second resolution; and adjusting the first resolution to a third resolution and the second resolution to the third resolution when the target resolution is equal to the third resolution, the third resolution being different from the first resolution, the third resolution being different from the second resolution.

In this embodiment, the third resolution may include, but is not limited to, one of the following: an original resolution of the decoded video frame, and the highest resolution obtained by upsampling the decoded video frame. In other words, in this embodiment, resolutions of the first decoded block and the second decoded block may be changed to the same resolution, and may be both changed to a resolution used in either decoded block in a pair of decoded blocks. In addition, both the resolutions may be changed to a third resolution. The third resolution is a predetermined resolution.

For example, it is assumed that both an original resolution of the first decoded block and an original resolution of the second decoded block are 8*8, the first resolution used in the first decoded block is 4*4, and the second resolution used in the second decoded block is 16*16. The foregoing target resolution may be, but is not limited to, one of the following: the original resolution of 8*8, the first resolution of 4*4, and the second resolution of 16*16. The decoded blocks are upsampled or downsampled, to change the resolutions to the same resolution.

For example, in this embodiment, the adjusting the first resolution of the first decoded block to a target resolution, and adjusting the second resolution of the second decoded block to the target resolution can include: downsampling the first resolution and/or the second resolution when the first resolution and/or the second resolution is greater than the target resolution, to obtain the target resolution; and upsampling the first resolution and/or the second resolution when the first resolution and/or the second resolution is less than the target resolution, to obtain the target resolution.

For example, in this embodiment the determining a first edge pixel set in the first decoded block, and determining a second edge pixel set in the second decoded block may include, but are not limited to: obtaining a pre-configured pixel row position and/or pixel column position; and determining pixels in the pixel row position and/or the pixel column position as the first edge pixel set and the second edge pixel set.

Figure 3:
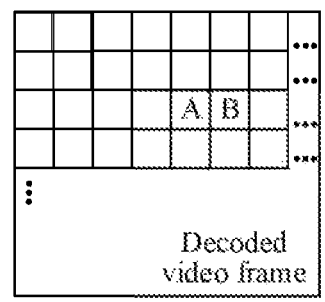
FIG. 3 is a schematic diagram of an exemplary video processing method according to an embodiment of this disclosure.
Figure 3:
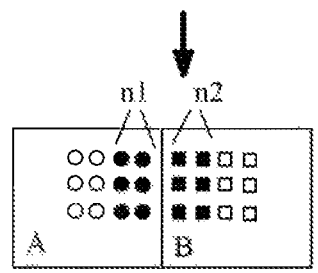

When the first decoded block and the second decoded block are adjacent in a row, the first edge pixel set and the second edge pixel set are determined according to the pre-configured pixel row position; and when the first decoded block and the second decoded block are adjacent in a column, the first edge pixel set and the second edge pixel set are determined according to the pre-configured pixel column position. As shown in FIG. 3, it is assumed that the decoded video frame includes a pair of decoded blocks adjacent in a row: a decoded block A (including circular pixels shown in a part (b) in FIG. 3) and a decoded block B (including square pixels shown in the part (b) in FIG. 3). When it is determined that the two decoded blocks are adjacent in a row, the first edge pixel set may be determined in pixels on a side adjacent to the decoded block B in the decoded block A, and as shown in the part (b) in FIG. 3, n1 solid circles form the first edge pixel set; the second edge pixel set is determined in pixels on a side adjacent to the decoded block A in the decoded block B, and as shown in the part (b) in FIG. 3, n2 solid boxes form the second edge pixel set.

In addition, in this embodiment, after both the resolution of the first decoded block and the resolution of the second decoded block are changed to the target resolution, the first edge pixel set is filtered to obtain a filtered first edge pixel set, and the second edge pixel set is filtered to obtain a filtered second edge pixel set, so that pixel values of pixels in the first edge pixel set fit pixel values of pixels in the second edge pixel set, thereby avoiding an obvious seam and reducing subjective parallax.

For example, in this embodiment, the filtering the first edge pixel set and filtering the second edge pixel set may include, but are not limited to: determining a current edge pixel in the first edge pixel set and the second edge pixel set; performing a weighted summation on pixel values of first reference pixels associated with the first edge pixel set and pixel values of second reference pixels associated with the second edge pixel set, to obtain a target pixel value; and updating a pixel value of the current edge pixel by using the target pixel value. A weight used in the weighted summation is determined according to distances between the reference pixels and the current edge pixel.

In this embodiment, the first reference pixels may be, but are not limited to, reference pixels in pixels that are in the first decoded block and are on a side adjacent to the second decoded block. The second reference pixels may be, but are not limited to, reference pixels in pixels that are in the second decoded block and are on a side adjacent to the first decoded block. The foregoing reference pixels are used to update the pixel values of the pixels in the first edge pixel set and the pixel values of the pixels in the second edge pixel set. In this way, edge filtering of the first decoded block and the second decoded block after both the resolutions are changed to the target resolution is implemented.

For example, in this embodiment, after the filtered first edge pixel set and the filtered second edge pixel set are obtained, the method may include, but is not limited to: performing rendering and display according to the filtered first edge pixel set and filtered second edge pixel set, and the method may further include, but is not limited to: using the decoded video frame including the filtered first edge pixel set and the filtered second edge pixel set as a reference frame for decoding reference by a subsequent video frame.

According to the embodiments provided in this disclosure, after a decoded video frame currently to be processed is obtained, at least one pair of decoded blocks to be reconstructed is determined, each pair of decoded blocks in the at least one pair of decoded blocks including a first decoded block using a first resolution and a second decoded block using a second resolution. The resolution adjustment is performed on the foregoing decoded blocks, and the edge filtering is performed on the edge pixel sets determined in the decoded blocks, to avoid an obvious seam in the video during the reconstruction, thereby overcoming the problem of video distortion in the related art.

In an exemplary solution, the filtering the first edge pixel set to obtain a filtered first edge pixel set, and filtering the second edge pixel set to obtain a filtered second edge pixel set can include: determining first reference pixels associated with the first edge pixel set in the first decoded block, and determining second reference pixels associated with the second edge pixel set in the second decoded block; and filtering the first edge pixel set and the second edge pixel set according to pixel values of the first reference pixels and pixel values of the second reference pixels, a first difference between a pixel value of an $i^{th}$ pixel in the filtered first edge pixel set and a pixel value of a $j^{th}$ pixel that corresponds to the $i^{th}$ pixel and is in the filtered second edge pixel set being less than a second difference between a pixel value of an $i^{th}$ pixel in the first edge pixel set and a pixel value of a $j^{th}$ pixel in the second edge pixel set, i being a positive integer and being less than or equal to a total quantity of pixels in the first edge pixel set, j being a positive integer and being less than or equal to a total quantity of pixels in the second edge pixel set.

The first reference pixels associated with the first edge pixel set may include, but are not limited to, a plurality of pixels that are in the first decoded block and are on a side adjacent to the second decoded block, the plurality of pixels including the first edge pixel set; and the second reference pixels associated with the second edge pixel set may include, but are not limited to, a plurality of pixels that are in the second decoded block and are on a side adjacent to the first decoded block, the plurality of pixels including the second edge pixel set. In other words, pixel values of the edge pixels are determined with reference to pixel values of a plurality of pixels in adjacent sides (e.g., adjacent rows/adjacent columns) of the two decoded blocks, thereby performing edge filtering on the decoded blocks with the same resolution, and avoiding an obvious seam in the restored video after decoding.

Figure 4:
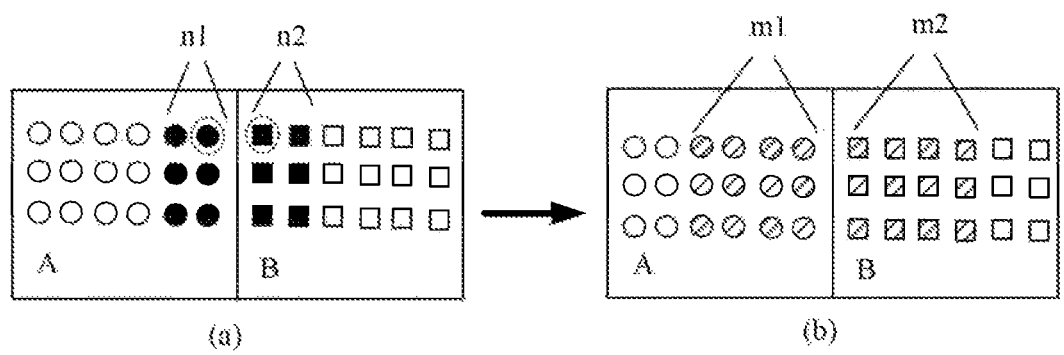
FIG. 4 is a schematic diagram of another exemplary video processing method according to an embodiment of this disclosure.

A detailed description is given with reference to FIG. 4. It is assumed that the decoded video frame includes a pair of decoded blocks: a decoded block A and a decoded block B. When it is determined that the two decoded blocks are adjacent in a row, the first edge pixel set may be determined in pixels on a side adjacent to the decoded block B in the decoded block A, and as shown in a part (a) in FIG. 4, n1 solid circles form the first edge pixel set; the second edge pixel set is determined in pixels on a side adjacent to the decoded block A in the decoded block B, and as shown in the part (a) in FIG. 4, n2 solid boxes form the second edge pixel set.

First reference pixels associated with the first edge pixel set are determined according to the n1 solid circles, which are m1 oblique-line circles shown in a part (b) in FIG. 4 and second reference pixels associated with the second edge pixel set are determined according to the n2 solid boxes, which are m2 oblique-line boxes shown in the part (b) in FIG. 4.

It is further assumed that a solid circle in a dashed-line box in the decoded block A shown in the part (a) of FIG. 4 is a current $i^{th}$ pixel, and a solid box in a dashed-line box in the decoded block B is a $j^{th}$ pixel corresponding to the $i^{th}$ pixel. After the first edge pixel set and the second edge pixel set are filtered according to pixel values of the first reference pixels and pixel values of the second reference pixels, a first difference f1 between a pixel value of an $i^{th}$ pixel in a filtered decoded block A and a pixel value of a $j^{th}$ pixel in a filtered decoded block B is determined, and a second difference f2 between a pixel value of the $i^{th}$ pixel in the decoded block A and a pixel value of the $j^{th}$ pixel in the decoded block B before the filtering is determined. The differences are compared, and it may be determined that f1<f2. That is, the difference between the pixel values of the pixels in the filtered edge pixel sets in the two decoded blocks is smaller.

According to the embodiments provided in this disclosure, the first edge pixel set and the second edge pixel set are filtered by using the pixel values of the first reference pixels and the pixel values of the second reference pixels, thereby implementing filtering by fusing the pixel values of pixels adjacent to the edge pixels, so that the pixel values of the edge pixels fit, to avoid an obvious seam during video playback, thereby reducing subjective parallax of a user and improving watching experience of the user.

In an exemplary solution, the filtering the first edge pixel set and the second edge pixel set according to pixel values of the first reference pixels and pixel values of the second reference pixels can include: sequentially performing the following operations until the first edge pixel set and the second edge pixel set are traversed: determining a current edge pixel in the first edge pixel set and the second edge pixel set; performing a weighted summation on the pixel values of the first reference pixels and the pixel values of the second reference pixels to obtain a target pixel value; and updating a pixel value of the current edge pixel to the target pixel value to obtain a filtered current edge pixel.

In this embodiment, for the decoded blocks with different resolutions, after all the resolutions are changed to the same target resolution, edge filtering is further performed on pixel values of adjacent edge pixels in the decoded blocks, so that the edge pixels are smoothed.

For example, in this embodiment, the foregoing step of performing a weighted summation on the pixel values of the first reference pixels and the pixel values of the second reference pixels to obtain a target pixel value can include: determining a position of the current edge pixel; sequentially obtaining a distance between a position of each reference pixel in the first reference pixels and the second reference pixels and the position of the current edge pixel; determining a weight matching the each reference pixel according to the distance; and performing the weighted summation on the pixel values of the first reference pixels and the pixel values of the second reference pixels by using the weights, to obtain the target pixel value.

Figure 5:
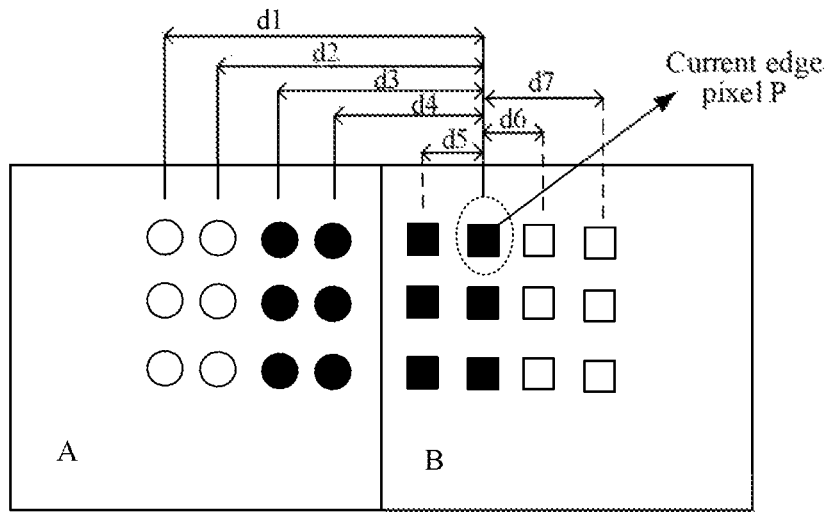
FIG. 5 is a schematic diagram of still another exemplary video processing method according to an embodiment of this disclosure.

A detailed description is given with reference to FIG. 5: it is assumed that a first edge pixel set in a first decoded block A includes the solid circles shown in FIG. 5, and a second edge pixel set in a second decoded block B includes the solid boxes shown in FIG. 5. In addition, first reference pixels in the first decoded block A are all circles shown in FIG. 5, second reference pixels in the second decoded block B are all boxes shown in FIG. 5, and pixel values of the reference pixels are sequentially Q1 to Q7 from left to right.

Further, it is assumed that a current edge pixel P shown in FIG. 5 (a pixel selected by a dashed-line box shown in the figure) is determined as a current edge pixel, which is located in the second column of the first row of the second decoded block B. In addition, distances between positions of the reference pixels and the position of the current edge pixel P are sequentially obtained. For example, the distances are sequentially d1 to d7 from left to right. Corresponding different weights are respectively determined according to the different distance. For example, the weights are sequentially α1 to α7 from left to right. That is, the weight corresponding to d1 is α1, and so on.

A target pixel value Q is calculated based on the foregoing assumptions, and a calculation formula is as follows:

$$Q=Q1*\alpha 1+Q2*\alpha 2+Q3*\alpha 3+Q4*\alpha 4+Q5*\alpha 5+Q6*\alpha 6+Q7*\alpha 7.$$

Each edge pixel in the first edge pixel set and the second edge pixel set is used as the current edge pixel, and the foregoing steps are repeated to determine a pixel value of the each edge pixel, thereby filtering the first edge pixel set and the second edge pixel set.

Further, after the first edge pixel set and the second edge pixel set are filtered, a first difference f1 between a pixel value of an $i^{th}$ pixel in a filtered decoded block A and a pixel value of a $j^{th}$ pixel in a filtered decoded block B is determined, and a second difference f2 between a pixel value of an $i^{th}$ pixel in the decoded block A and a pixel value of a $j^{th}$ pixel in the decoded block B before the filtering is determined. The differences are compared, and it may be determined that f1<f2. That is, the difference between the pixel values of the pixels in the filtered edge pixel sets in the two decoded blocks is smaller. i represents the $i^{th}$ pixel in the first edge pixel set, and i is a positive integer. j represents the $j^{th}$ pixel in the second edge pixel set, and j is a positive integer.

According to the embodiments provided in this disclosure, the pixel values of the reference pixels are fused to calculate the pixel values of the edge pixels, to implement edge filtering, thereby avoiding an obvious seam after the video is restored, and reducing subjective parallax of the user.

In an exemplary solution, the determining a first edge pixel set in the first decoded block, and determining a second edge pixel set in the second decoded block can include: obtaining a first row position and/or a first column position pre-configured in the first decoded block and a second row position and/or a second column position pre-configured in the second decoded block; and determining the first edge pixel set according to the first row position and/or the first column position, and determining the second edge pixel set according to the second row position and/or the second column position.

When the first decoded block and the second decoded block are adjacent in a row, the pre-configured first column position and second column position are obtained; and when the First decoded block and the second decoded block are adjacent in a column, the pre-configured first row position and second row position are obtained. The pre-configured first row position/second row position may be, but is not limited to, one or more row positions in the decoded blocks, and the pre-configured first column position/second column position may be, but is not limited to, one or more column positions in the decoded blocks. In addition, a quantity of first row positions may be equal to or different from that of second row positions; and a quantity of first column positions may be equal to or different from that of second column positions. The quantities may be determined with reference to a specific application scenario, and this is not limited in this embodiment.

For example, as shown in FIG. 5, among the plurality of rows and columns of pixels in the first decoded block A, the pixels indicated by the solid circles shown in FIG. 5 may be determined as the first edge pixel set; and among the plurality of rows and columns of pixels in the second decoded block B, the pixels indicated by the solid boxes shown in FIG. 5 may be determined as the second edge pixel set.

According to the embodiments provided in this disclosure, the edge pixel sets are determined according to the pre-configured row positions/column positions, thereby implementing uniform edge filtering on the decoded blocks.

In an exemplary solution, the adjusting the first resolution the first decoded block to a target resolution, and adjusting the second resolution of the second decoded block to the target resolution can include: adjusting the second resolution to the first resolution when the target resolution is equal to the first resolution; adjusting the first resolution to the second resolution when the target resolution is equal to the second resolution; and adjusting the first resolution to a third resolution and the second resolution to the third resolution when the target resolution is equal to the third resolution, the third resolution being different from the first resolution, the third resolution being different from the second resolution.

In this embodiment, when resolutions are changed to the same resolution, it may be chosen to change all the resolutions to either resolution such as a first resolution or a second resolution in a pair of decoded blocks. In addition, both the resolutions may be alternatively changed to a third resolution. The third resolution may be, but is not limited to, an original resolution of the decoded blocks or the highest resolution supported by the decoded blocks. The foregoing description is merely an example, which is not limited in this embodiment.

For example, in this embodiment, the adjusting the first resolution of the first decoded block to a target resolution, and adjusting the second resolution of the second decoded block to the target resolution can include: downsampling the first resolution when the first resolution is greater than the target resolution, to obtain the target resolution; or, upsampling the first resolution when the first resolution is less than the target resolution, to obtain the target resolution; and downsampling the second resolution when the second resolution is greater than the target resolution, to obtain the target resolution; or, upsampling the second resolution when the second resolution is less than the target resolution, to obtain the target resolution.

A detailed description is given with reference to the following example: it is assumed that the original resolution of the first decoded block and the original resolution of the second decoded block are 8*8, the first resolution used in the first decoded block is 4*4, the second resolution used in the second decoded block is 16*16, and the target resolution is the original resolution of 8*8.

It is determined after comparison that, the first resolution is less than the target resolution, the first resolution of 4*4 is then upsampled to obtain the target resolution of 8*8; and the second resolution is greater than the target resolution, the second resolution of 16*16 is then downsampled to obtain the target resolution of 8*8. Further, edge filtering is performed on the first decoded block and the second decoded block of which both resolutions are changed to the target resolution of 8*8. For an exemplary processing procedure, reference may be made to the foregoing embodiments, and details are not described herein again in this embodiment.

According to the embodiments provided in this disclosure, the first resolution and the second resolution are changed to the same resolution in a manner of upsampling (e.g., using interpolation) or downsampling, so that for the first decoded block and the second decoded block with different resolutions, both the resolutions can be changed to the target resolution, thereby facilitating subsequent edge filtering operations, and further overcoming the problem of video distortion caused by different resolutions in the related art.

According to another aspect of the embodiments of this disclosure, a video processing method is provided. In an exemplary implementation, the video processing method may be applied to, but is not limited to, the environment shown in FIG. 1.

Figure 6:
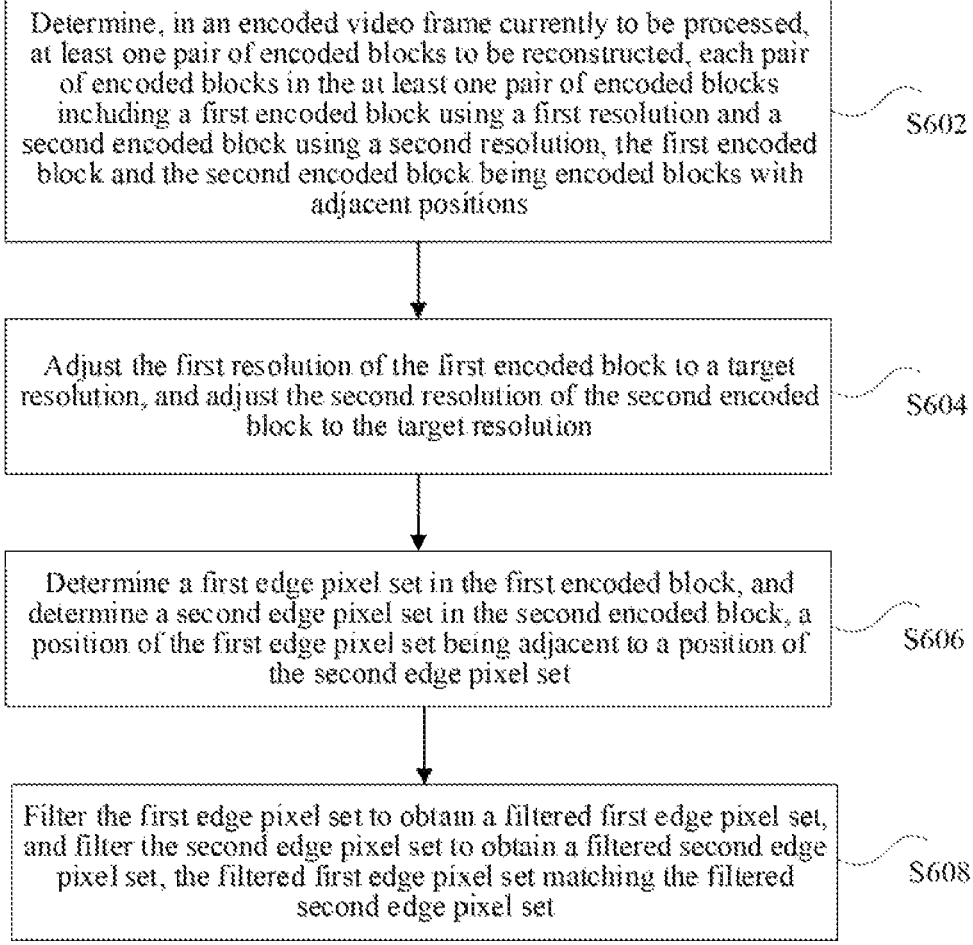
FIG. 6 is a flowchart of another exemplary video processing method according to an embodiment of this disclosure.

In an exemplary implementation, as shown in FIG. 6, the foregoing video processing method may be applied to an encoder side. The method can include the following steps:

In step S602, in an encoded video frame currently to be processed at least one pair of encoded blocks to be reconstructed is determined, each pair of encoded blocks in the at least one pair of encoded blocks including a first encoded block using a first resolution and a second encoded block using a second resolution, the first encoded block and the second encoded block being encoded blocks with adjacent positions.

In step S604, the first resolution of the first encoded block is adjusted to a target resolution, and the second resolution of the second encoded block is adjusted to the target resolution.

In step S606, a first edge pixel set in the first encoded block is determined, and a second edge pixel set in the second encoded block is determined, a position of the first edge pixel set being adjacent to a position of the second edge pixel set.

In step S608, the first edge pixel set is filtered to obtain a filtered first edge pixel set, and the second edge pixel set is filtered to obtain a filtered second edge pixel set, the filtered first edge pixel set matching the filtered second edge pixel set.

The video processing method shown in FIG. 2 may be used in, but is not limited to, the video encoder shown in FIG. 1. The foregoing video processing procedure can be completed through interaction of the video encoder and other components according to other embodiments.

For example, in this embodiment, the video processing method may be applied to, but is not limited to, application scenarios such as video playback applications, video sharing applications, or video session applications. Videos transmitted in the foregoing application scenarios may include, but are not limited to, long videos and short videos. For example, a long video may be a play episode with a long playback time (e.g., the playback time is greater than 10 minutes), or a picture displayed in a long video session; and a short video may be a voice message exchanged between two or more parties, or a video with a short playback time (e.g., the playback time is less than or equal to 30 seconds displayed on a sharing platform. The foregoing description is merely an example. The video processing method provided in this embodiment may be applied to, but not limited to, a playback device configured to play videos in the foregoing application scenarios. After an encoded video frame currently to be processed is obtained, at least one pair of encoded blocks to be reconstructed are determined, each pair of encoded blocks in the at least one pair of encoded blocks including a first encoded block using a first resolution and a second encoded block using a second resolution. The resolution adjustment is performed on the foregoing encoded blocks, and the edge filtering is performed on the edge pixel sets determined in the encoded blocks, to avoid an obvious seam in the video during the reconstruction, thereby overcoming the problem of video distortion in the related art.

In an exemplary solution, the filtering the first edge pixel set to obtain a filtered first edge pixel set, and filtering the second edge pixel set to obtain a filtered second edge pixel set can include: determining first reference pixels associated with the first edge pixel set in the first encoded block, and determining second reference pixels associated with the second edge pixel set in the second encoded block; and filtering the first edge pixel set and the second edge pixel set according to pixel values of the first reference pixels and pixel values of the second reference pixels, a first difference between a pixel value of an pixel in the filtered first edge pixel set and a pixel value of a $j^{th}$ pixel that corresponds to the $i^{th}$ pixel and is in the filtered second edge pixel set being less than a second difference between a pixel value of an $i^{th}$ pixel in the first edge pixel set and a pixel value of a $j^{th}$ pixel in the second edge pixel set, i being a positive integer and being less than or equal to a total quantity of pixels in the first edge pixel set, j being a positive integer and being less than or equal to a total quantity of pixels in the second edge pixel set.

In an exemplary solution, the filtering the first edge pixel set and the second edge pixel set according to pixel values of the first reference pixels and pixel values of the second reference pixels can include: sequentially performing the following operations until the first edge pixel set and the second edge pixel set are traversed: determining a current edge pixel in the first edge pixel set and the second edge pixel set; performing a weighted summation on the pixel values of the first reference pixels and the pixel values of the second reference pixels to obtain a target pixel value; and updating a pixel value of the current edge pixel to the target pixel value to obtain a filtered current edge pixel.

In an exemplary solution, the performing a weighted summation on the pixel values of the first reference pixels and the pixel values of the second reference pixels to obtain a target pixel value can include: determining a position of the current edge pixel; sequentially obtaining a distance between a position of each reference pixel in the first reference pixels and the second reference pixels and the position of the current edge pixel; determining a weight matching the each reference pixel according to the distance; and performing the weighted summation on the pixel values of the first reference pixels and the pixel values of the second reference pixels by using the weights, to obtain the target pixel value.

In addition, in this embodiment, for related operations of changing resolutions to be the same resolution and edge filtering operations, reference may be made to the foregoing embodiment of the decoder side, and details are not described herein again in this embodiment.

For ease of description, the foregoing method embodiments are stated as a series of action combinations. However, a person skilled in the art should understand that this disclosure is not limited to the described sequence of the actions because according to this disclosure, some steps may be performed in another sequence or may be simultaneously performed. In addition, a person skilled in the art should also understand that the embodiments described in this disclosure are all exemplary embodiments, and the involved actions and modules are not necessarily required to this disclosure.

Figure 7:
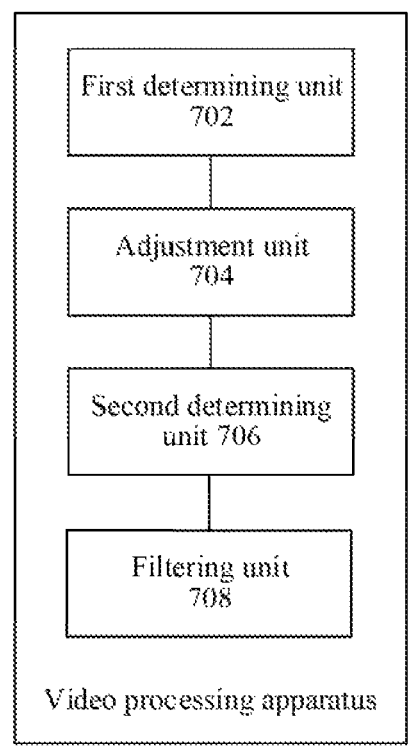
FIG. 7 is a schematic structural diagram of an exemplary video processing apparatus according to an embodiment of this disclosure.

According to another aspect of the embodiments of this disclosure, a video processing apparatus configured to implement the foregoing video processing method is further provided. As shown in FIG. 7, the apparatus is applied to a decoder side and can include: a first determining unit 702, an adjustment unit 704, a second determining unit 706, and a filtering unit 708. One or more modules, submodules, and/or units of the apparatus can be implemented by processing circuitry, software, or a combination thereof for example.

The first determining unit 702 is configured to determine, in a decoded video frame currently to be processed, at least one pair of decoded blocks to be reconstructed, each pair of decoded blocks in the at least one pair of decoded blocks including a first decoded block using a first resolution and a second decoded block using a second resolution, the first decoded block and the second decoded block being decoded blocks with adjacent positions.

The adjustment unit 704 is configured to adjust the first resolution of the first decoded block to a target resolution, and adjust the second resolution of the second decoded block to the target resolution.

The second determining unit 706 is configured to determine a first edge pixel set in the first decoded block, and determine a second edge pixel set in the second decoded block, a position of the first edge pixel set being adjacent to a position of the second edge pixel set.

The filtering unit 708 is configured to filter the first edge pixel set to obtain a filtered first edge pixel set, and filter the second edge pixel set to obtain a filtered second edge pixel set, the filtered first edge pixel set matching the filtered second edge pixel set.

For exemplary embodiments, reference may be made to the examples shown in the foregoing video processing method on the decoder side, and details are not described herein again in this example.

In an exemplary solution, the filtering unit 708 can include a first determining module and a filtering module.

The first determining module is configured to determine first reference pixels associated with the first edge pixel set in the first decoded block, and determine second reference pixels associated with the second edge pixel set in the second decoded block.

The filtering module is configured to filter the first edge pixel set and the second edge pixel set according to pixel values of the first reference pixels and pixel values of the second reference pixels, a first difference between a pixel value of an $i^{th}$ pixel in the filtered first edge pixel set and a pixel value of a $j^{th}$ pixel that corresponds to the $i^{th}$ pixel and is in the filtered second edge pixel set being less than a second difference between a pixel value of an $i^{th}$ pixel in the first edge pixel set and a pixel value of a $j^{th}$ pixel in the second edge pixel set, i being a positive integer and being less than or equal to a total quantity of pixels in the first edge pixel set, j being a positive integer and being less than or equal to a total quantity of pixels in the second edge pixel set.

For exemplary embodiments, reference may be made to the examples shown in the foregoing video processing method on the decoder side, and details are not described herein again in this example.

In an exemplary solution, the filtering module can include a processing submodule that is configured to sequentially perform the following operations until the first edge pixel set and the second edge pixel set are traversed: determining a current edge pixel in the first edge pixel set and the second edge pixel set; performing a weighted summation on the pixel values of the first reference pixels and the pixel values of the second reference pixels to obtain a target pixel value; and updating a pixel value of the current edge pixel to the target pixel value to obtain a filtered current edge pixel.

For exemplary embodiments, reference may be made to the examples shown in the foregoing video processing method on the decoder side, and details are not described herein again in this example.

In an exemplary solution, the processing submodule implements the performing a weighted summation on the pixel values of the first reference pixels and the pixel values of the second reference pixels to obtain a target pixel value through the following steps: determining a position of the current edge pixel; sequentially obtaining a distance between a position of each reference pixel in the first reference pixels and the second reference pixels and the position of the current edge pixel; determining a weight matching the each reference pixel according to the distance; and performing the weighted summation on the pixel values of the first reference pixels and the pixel values of the second reference pixels by using the weights, to obtain the target pixel value.

For exemplary embodiments, reference may be made to the examples shown in the foregoing video processing method on the decoder side, and details are not described herein again in this example.

In an exemplary solution, the second determining unit 706 can include an obtaining module and a third determining module.

The obtaining module is configured to obtain a first row position and/or a first column position pre-configured in the first decoded block and a second row position and/or a second column position pre-configured in the second decoded block.

The third determining module is configured to determine the first edge pixel set according to the first row position and/or the first column position, and determine the second edge pixel set according to the second row position and/or the second column position.

For exemplary embodiments, reference may be made to the examples shown in the foregoing video processing method on the decoder side, and details are not described herein again in this example.

In an exemplary solution, the adjustment unit 704 can include: a first adjustment module, a second adjustment module, and a third adjustment module.

The first adjustment module is configured to adjust the second resolution to the first resolution when the target resolution is equal to the first resolution.

The second adjustment module is configured to adjust the first resolution to the second resolution when the target resolution is equal to the second resolution.

The third adjustment module is configured to adjust the first resolution to a third resolution and the second resolution to the third resolution when the target resolution is equal to the third resolution, the third resolution being different from the first resolution, the third resolution being different from the second resolution.

For exemplary embodiments, reference may be made to the examples shown in the foregoing video processing method on the decoder side, and details are not described herein again in this example.

In an exemplary solution, the adjustment unit 704 can include a first sampling module and a second sampling module.

The first sampling module is configured to downsample the first resolution when the first resolution is greater than the target resolution, to obtain the target resolution; or, upsample the first resolution when the first resolution is less than the target resolution, to obtain the target resolution.

The second sampling module is configured to downsample the second resolution when the second resolution is greater than the target resolution, to obtain the target resolution; or, upsample the second resolution when the second resolution is less than the target resolution, to obtain the target resolution.

For exemplary embodiments, reference may be made to the examples shown in the foregoing video processing method on the decoder side, and details are not described herein again in this example.

Figure 8:
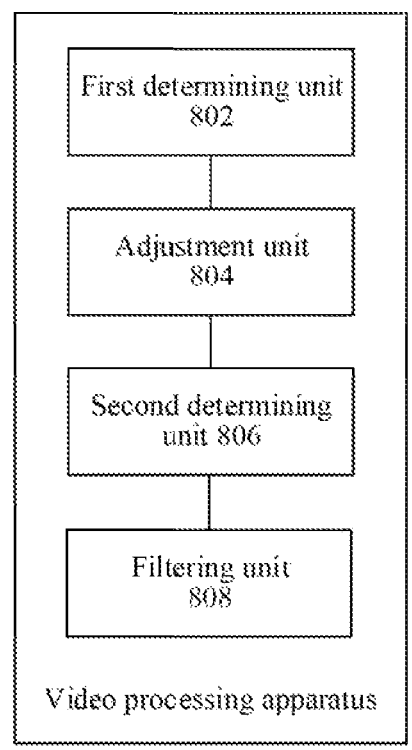
FIG. 8 is a schematic structural diagram of another exemplary video processing apparatus according to an embodiment of this disclosure.

According to another aspect of the embodiments of this disclosure, a video processing apparatus configured to implement the foregoing video processing method is further provided. As shown in FIG. 8, the apparatus is applied to an encoder side and can include: a first determining unit 802, an adjustment unit 804, a second determining unit 806, and a filtering unit 808. One or more modules, submodules, and/or units of the apparatus can be implemented by processing circuitry, software, or a combination thereof, for example.

The first determining unit 802 is configured to determine, in an encoded video frame currently to be processed, at least one pair of encoded blocks to be reconstructed, each pair of encoded blocks in the at least one pair of encoded blocks including a first encoded block using a first resolution and a second encoded block using a second resolution, the first encoded block and the second encoded block being encoded blocks with adjacent positions.

The adjustment unit 804 is configured to adjust the first resolution of the first encoded block to a target resolution, and adjust the second resolution of the second encoded block to the target resolution.

The second determining unit 806 is configured to determine a first edge pixel set in the first encoded block, and determine a second edge pixel set in the second encoded block, a position of the first edge pixel set being adjacent to a position of the second edge pixel set.

The filtering unit 808 is configured to filter the first edge pixel set to obtain a filtered first edge pixel set, and filter the second edge pixel set to obtain a filtered second edge pixel set, the filtered first edge pixel set matching the filtered second edge pixel set.

For exemplary embodiments, reference may be made to the explanation shown in the foregoing video processing method on the encoder side. For related operations of changing resolutions to be the same resolution and edge filtering operations, reference may be made to the foregoing embodiment of the decoder side, and details are not described herein again in this embodiment.

In an exemplary solution, the filtering unit 808 can include a first determining module and a filtering module.

The first determining module is configured to determine first reference pixels associated with the first edge pixel set in the first encoded block, and determine second reference pixels associated with the second edge pixel set in the second encoded block.

The filtering module is configured to filter the first edge pixel set and the second edge pixel set according to pixel values of the first reference pixels and pixel values of the second reference pixels, a first difference between a pixel value of an $i^{th}$ pixel in the filtered first edge pixel set and a pixel value of a $j^{th}$ pixel that corresponds to the $i^{th}$ pixel and is in the filtered second edge pixel set being less than a second difference between a pixel value of an $i^{th}$ pixel in the first edge pixel set and a pixel value of a $j^{th}$ pixel in the second edge pixel set, i being a positive integer and being less than or equal to a total quantity of pixels in the first edge pixel set, j being a positive integer and being less than or equal to a total quantity of pixels in the second edge pixel set.

For exemplary embodiments, reference may be made to the examples shown in the foregoing video processing method on the decoder side, and details are not described herein again in this example.

In an exemplary solution, the filtering module can include a processing submodule that is configured to sequentially perform the following operations until the first edge pixel set and the second edge pixel set are traversed: determining a current edge pixel in the first edge pixel set and the second edge pixel set;

performing a weighted summation on the pixel values of the first reference pixels and the pixel values of the second reference pixels to obtain a target pixel value; and updating a pixel value of the current edge pixel to the target pixel value to obtain a filtered current edge pixel.

For exemplary embodiments, reference may be made to the examples shown in the foregoing video processing method on the decoder side, and details are not described herein again in this example.

In an exemplary solution, the processing submodule implements the performing a weighted summation on the pixel values of the first reference pixels and the pixel values of the second reference pixels to obtain a target pixel value through the following steps: determining a position of the current edge pixel; sequentially obtaining a distance between a position of each reference pixel in the first reference pixels and the second reference pixels and the position of the current edge pixel; determining a weight matching the each reference pixel according to the distance; and performing the weighted summation on the pixel values of the first reference pixels and the pixel values of the second reference pixels by using the weights, to obtain the target pixel value.

Figure 9:
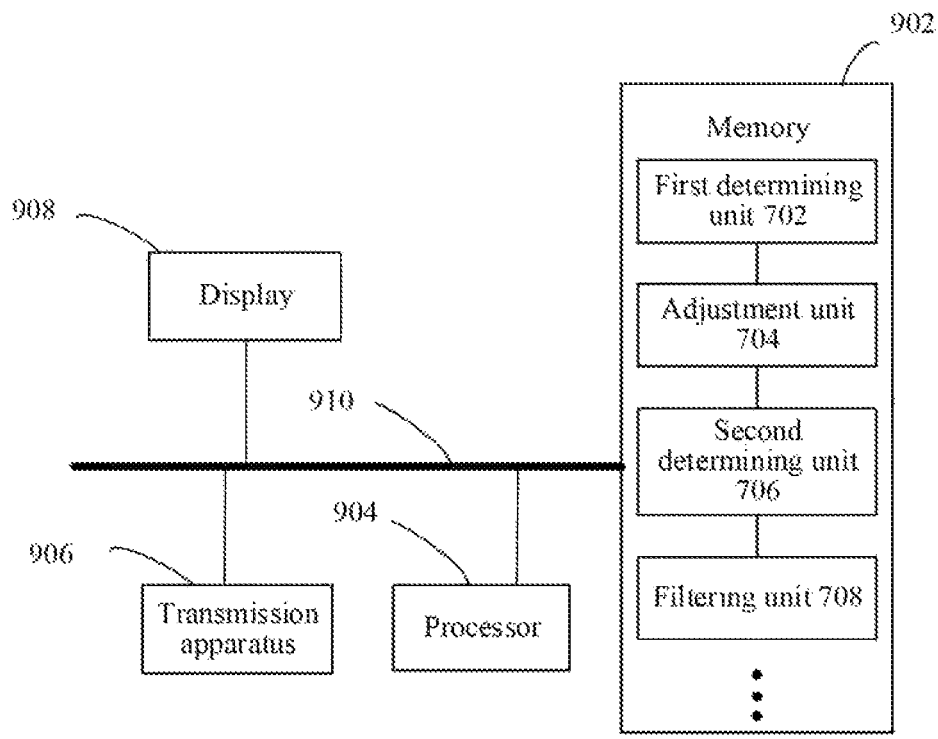
FIG. 9 is a schematic structural diagram of still another exemplary video processing apparatus according to an embodiment of this disclosure.

According to still another aspect of the embodiments of this disclosure, an electronic device configured to implement the foregoing video processing method is further provided. As shown in FIG. 9, the electronic device includes a memory 902 and a processor 904, the memory 902 storing computer-readable instructions, and the processor 904 being configured to perform the steps in any one of the foregoing method embodiments through the computer-readable instructions.

For example, in this embodiment, the electronic device may be located in at least one of a plurality of network devices of a computer network.

For example, in this embodiment, the foregoing processor may be configured to perform the following steps through the computer-readable instructions: determining, in a decoded video frame currently to be processed, at least one pair of decoded blocks to be reconstructed, each pair of decoded blocks in the at least one pair of decoded blocks including a first decoded block using a first resolution and a second decoded block using a second resolution, the first decoded block and the second decoded block being decoded blocks with adjacent positions; adjusting the first resolution of the first decoded block to a target resolution, and adjusting the second resolution of the second decoded block to the target resolution; determining a first edge pixel set in the first decoded block, and determining a second edge pixel set in the second decoded block, a position of the first edge pixel set being adjacent to a position of the second edge pixel set; and filtering the first edge pixel set to obtain a filtered first edge pixel set, and filtering the second edge pixel set to obtain a filtered second edge pixel set, the filtered first edge pixel set matching the filtered second edge pixel set.

A person of ordinary skill in the art should understand that, the structure shown in FIG. 9 is only illustrative. The electronic device may be alternatively a terminal device such as a smartphone (e.g., an Android mobile phone or an iOS mobile phone), a tablet computer, a palmtop computer, a mobile Internet device (MID), or a PAD. FIG. 9 does not constitute a limitation on a structure of the electronic device. For example, the electronic device may further include more or fewer components (e.g., a network interface) than those shown in FIG. 9, or have a configuration different from that shown in FIG. 9.

The memory 902 may be configured to store computer-readable instructions and modules, for example, program instructions/modules corresponding to the video processing method and apparatus in the embodiments of this disclosure. The processor 904 performs various functional applications and data processing by running the computer-readable instructions and modules stored in the memory 902, that is, implementing the foregoing video processing method. The memory 902 may include a non-transitory computer-readable storage medium such as a high-speed random memory, and may also include a non-volatile memory, for example, one or more magnetic storage apparatuses, a flash memory, or another non-volatile solid-state memory. In some embodiments, the memory 902 may further include memories remotely disposed relative to the processor 904, and the remote memories may be connected to a terminal through a network. Examples of the network include, but are not limited to, the Internet, an intranet, a local area network, a mobile communication network, and a combination thereof. The memory 902 may be further configured to, but not limited to, store information such as a decoded video frame and related resolutions. In an example, as shown in FIG. 9, the memory 902 may include, but not limited to, the first determining unit 702, the adjustment unit 704, the second determining unit 706, and the filtering unit 708 in the foregoing video processing apparatus. In addition, the memory may further include, but not limited to, other modules and units in the foregoing video processing apparatus, and details are not described herein again in this example.

In an embodiment, a transmission apparatus 906 is configured to receive or transmit data through a network. Specific examples of the network may include a wired network and a wireless network. In an example, the transmission apparatus 906 includes a network interface controller (NIC). The NIC may be connected to another network device and a router by using a network cable, to communicate with the Internet or a local area network. In an example, the transmission apparatus 906 is a radio frequency (RF) module, which communicates with the Internet in a wireless manner.

In addition, the foregoing electronic device further includes: a display 908, configured to display the foregoing decoded video frame; and a connection bus 910, configured to connect various module components in the electronic device.

Figure 10:
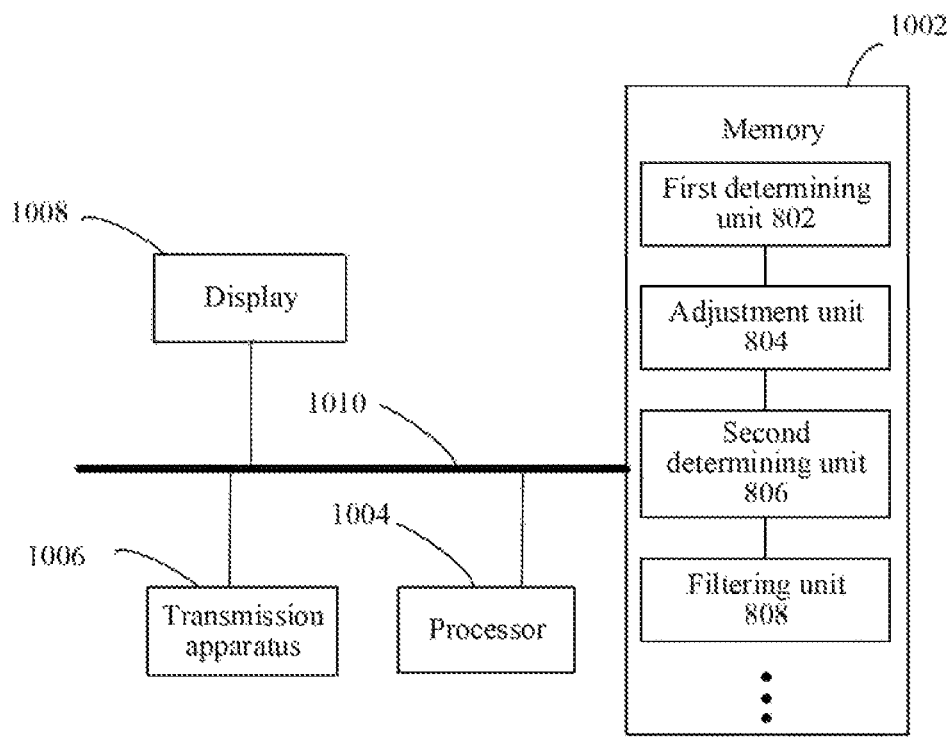
FIG. 10 is a schematic structural diagram of an exemplary electronic device according to an embodiment of this disclosure.

According to still another aspect of the embodiments of this disclosure, an electronic device configured to implement the foregoing video processing method is further provided. As shown in FIG. 10, the electronic device includes a memory 1002 and a processor 1004, the memory 1002 storing computer-readable instructions, and the processor 1004 being configured to perform the steps in any one of the foregoing method embodiments through the computer-readable instructions.

In an embodiment, the electronic device may be located in at least one of a plurality of network devices of a computer network.

In an embodiment, the foregoing processor may be configured to perform the following steps through the computer-readable instructions: determining, in an encoded video frame currently to be processed, at least one pair of encoded blocks to be reconstructed, each pair of encoded blocks in the at least one pair of encoded blocks including a first encoded block using a first resolution and a second encoded block using a second resolution, the first encoded block and the second encoded block being encoded blocks with adjacent positions; adjusting the first resolution of the first encoded block to a target resolution, and adjusting the second resolution of the second encoded block to the target resolution; determining a first edge pixel set in the first encoded block, and determining a second edge pixel set in the second encoded block, a position of the first edge pixel set being adjacent to a position of the second edge pixel set; and filtering the first edge pixel set to obtain a filtered first edge pixel set, and filtering the second edge pixel set to obtain a filtered second edge pixel set, the filtered first edge pixel set matching the filtered second edge pixel set.

A person of ordinary skill in the art may understand that, the structure shown in FIG. 10 is only illustrative. The electronic device may be alternatively a terminal device such as a smart phone (e.g., an Android mobile phone or an iOS mobile phone), a tablet computer, a palmtop computer, an MID, or a PAD. FIG. 10 does not constitute a limitation on a structure of the electronic device. For example, the electronic device may further include more or fewer components (e.g., a network interface) than those shown in FIG. 10, or have a configuration different from that shown in FIG. 10.

The memory 1002 may be configured to store computer-readable instructions and modules, for example, computer-readable instructions/modules corresponding to the video processing method\ and apparatus in the embodiments of this disclosure. The processor 1004 performs various functional applications and data processing by running the computer-readable instructions and modules stored in the memory 1002, that is, implementing the foregoing video processing method. The memory 1002 may include a non-transitory computer-readable storage medium such as a high-speed random memory, and may also include a non-volatile memory, for example, one or more magnetic storage apparatuses, a flash memory, or another non-volatile solid-state memory. In some embodiments, the memory 1002 may further include memories remotely disposed relative to the processor 1004, and the remote memories may be connected to a terminal through a network. Examples of the network include, but are not limited to, the Internet, an intranet, a local area network, a mobile communication network, and a combination thereof. The memory 1002 may be further configured to, but not limited to, store information such as a decoded video frame and related resolutions. In an example, as shown in FIG. 10, the memory 1002 may include, but is not limited to, the first determining unit 802, the adjustment unit 804, the second determining unit 806, and the filtering unit 808 in the foregoing video processing apparatus. In addition, the memory may further include, but is not limited to, other modules and units in the foregoing video processing apparatus, and details are not described herein again in this example.

In an embodiment, a transmission apparatus 1006 is configured to receive or transmit data through a network. Specific examples of the network may include a wired network and a wireless network. In an example, the transmission apparatus 1006 includes an NIC. The NIC may be connected to another network device and a router by using a network cable, to communicate with the Internet or a local area network. In an example, the transmission apparatus 1006 is an RF module, which communicates with the Internet in a wireless manner.

In addition, the foregoing electronic device further includes: a display 1008, configured to display the foregoing decoded video frame; and a connection bus 1010, configured to connect various module components in the electronic device.

According to yet another aspect of the embodiments of this disclosure, a computer-readable storage medium (e.g., a non-transitory computer-readable storage medium) is further provided. The computer-readable storage medium stores computer-readable instructions, the computer-readable instructions being configured to perform, when run, the steps in any one of the foregoing method embodiments.

In an embodiment, the computer-readable storage medium may be configured to store computer-readable instructions for performing the following steps: determining, in a decoded video frame currently to be processed, at least one pair of decoded blocks to be reconstructed, each pair of decoded blocks in the at least one pair of decoded blocks including a first decoded block using a first resolution and a second decoded block using a second resolution, the first decoded block and the second decoded block being decoded blocks with adjacent positions; adjusting the first resolution of the first decoded block to a target resolution, and adjusting the second resolution of the second decoded block to the target resolution; determining a first edge pixel set in the first decoded block, and determining a second edge pixel set in the second decoded block, a position of the first edge pixel set being adjacent to a position of the second edge pixel set; and filtering the first edge pixel set to obtain a filtered first edge pixel set, and filtering the second edge pixel set to obtain a filtered second edge pixel set, the filtered first edge pixel set matching the filtered second edge pixel set.

In an embodiment, the computer-readable storage medium may be further configured to store computer-readable instructions for performing the following steps: determining, in an encoded video frame currently to be processed, at least one pair of encoded blocks to be reconstructed, each pair of encoded blocks in the at least one pair of encoded blocks including a first encoded block using a first resolution and a second encoded block using a second resolution, the first encoded block and the second encoded block being encoded blocks with adjacent positions; adjusting the first resolution of the first encoded block to a target resolution, and adjusting the second resolution of the second encoded block to the target resolution; determining a first edge pixel set in the first encoded block, and determining a second edge pixel set in the second encoded block, a position of the first edge pixel set being adjacent to a position of the second edge pixel set; and filtering the first edge pixel set to obtain a filtered first edge pixel set, and filtering the second edge pixel set to obtain a filtered second edge pixel set, the filtered first edge pixel set matching the filtered second edge pixel set.

A person of ordinary skill in the art should understand that all or some of the steps of the methods in the foregoing embodiments can be implemented by computer-readable instructions instructing relevant hardware such as a processor or other processing circuitry of a terminal device. The computer-readable instructions may be stored in a computer-readable storage medium, and the storage medium may include a flash drive, a read-only memory (ROM), a random access memory (RAM), a magnetic disk a compact disc, and the like.

The sequence numbers of the foregoing embodiments of this disclosure are merely for description purposes, and are not intended to indicate priorities of the embodiments.

When the integrated unit in the foregoing embodiments is implemented in a form of a software functional unit and sold or used as an independent product, the integrated unit may be stored in the foregoing computer-readable storage medium. Based on smell an understanding, technical solutions of this disclosure may be implemented in a form of a software product. The computer software product is stored in a storage medium and includes several computer-readable instructions for instructing one or more computer devices (which may be a PC, a server, a network device, or the like) to perform all or some of steps of the methods in the embodiments of this disclosure.

In the foregoing embodiments of this disclosure, the descriptions of the embodiments have respective focuses. For a part that is not described in detail in an embodiment, reference may be made to related descriptions in other embodiments.

In the several embodiments provided in this disclosure, it is to be understood that, the disclosed client may be implemented in another manner. The apparatus embodiments described above are merely exemplary. For example, the unit division is merely logical function division and may be other division in actual implementation. For example, a plurality of units or components may be combined or integrated into another system, or some features may be omitted or not performed. In addition, the displayed or discussed mutual couplings or direct couplings or communication connections may be implemented through some interfaces. The indirect couplings or communication connections between the units or modules may be implemented in electrical or other forms.

The units described as separate components may or may not be physically separated, and the components displayed as units may or may not be physical units, and may be located in one place or may be distributed on a plurality of network units. Some or all of the units may be selected according to actual requirements to achieve the objectives of the solutions of the embodiments.

In addition, functional units in the embodiments of this disclosure may be integrated into one processing unit, or each of the units may exist alone physically, or two or more units may be integrated into one unit. The integrated unit may be implemented in a form of hardware, or may be implemented in a form of a software functional unit.

The foregoing descriptions are merely exemplary implementations of this disclosure. A person of ordinary skill in the art may further make several improvements and modifications without departing from the principle of this disclosure, and the improvements and modifications are also considered as falling within the protection scope of this disclosure.

What is claimed is:

1. A video processing method, the method comprising:
    determining at least one pair of decoded blocks to be reconstructed in a video frame, each pair of decoded blocks in the at least one pair of decoded blocks including a first decoded block of a first resolution and a second decoded block of a second resolution, the first decoded block being adjacent to the second decoded block;
    adjusting the first resolution of the first decoded block to a target resolution;
    adjusting the second resolution of the second decoded block to the target resolution;
    determining a first edge pixel set in the first decoded block;
    determining a second edge pixel set in the second decoded block, the second edge pixel set being adjacent to the first edge pixel set; and
    filtering, by processing circuitry, the firm edge pixel set and the second edge pixel set.

2. The method according to claim 1, wherein the filtering comprises:
    determining first reference pixels associated with the first edge pixel set in the first decoded block,
    determining second reference pixels associated with the second edge pixel set in the second decoded block, and
    filtering the first edge pixel set and the second edge pixel set according to pixel values of the first reference pixels and pixel values of the second reference pixels, a first difference between a pixel value of an $i^{th}$ pixel in the filtered first edge pixel set and a pixel value of a $j^{th}$ pixel that corresponds to the $i^{th}$ pixel and is in the filtered second edge pixel set being less than a second difference between a pixel value of an $i^{th}$ pixel in the first edge pixel set and a pixel value of a $j^{th}$ pixel in the second edge pixel set, i being a positive integer that is less than or equal to a total quantity of pixels in the first edge pixel set, j being a positive integer that is less than or equal to a total quantity of pixels in the second edge pixel set.

3. The method according to claim 2, wherein the filtering comprises:
    determining edge pixels in the first edge pixel set and the second edge pixel set; and
    for each of the edge pixels,
        performing a weighted summation on the pixel values of the first reference pixels and the pixel values of the second reference pixels to obtain a target pixel value of the respective edge pixel; and
        updating a pixel value of the respective edge pixel to the target pixel value of the respective edge pixel to obtain a filtered respective edge pixel.

4. The method according to claim 3, wherein the performing the weighted summation comprises:
    determining a position of the respective edge pixel;
    obtaining a distance between a position of each reference pixel in the first reference pixels and the second reference pixels and the position of the respective edge pixel;
    determining a weight for each reference pixel according to the distance from the position of the respective edge pixel; and
    performing the weighted summation on the pixel values of the first reference pixels and the pixel values of the second reference pixels by using the weights, to obtain the target pixel value of the respective edge pixel.

5. The method according to claim 1, wherein
    the determining the first edge pixel set includes:
        obtaining a first row position and/or a first column position pre-configured in the first decoded block, and
        determining the first edge pixel set according to the first row position and/or the first column position; and
    the determining the second edge pixel set includes:
        obtaining a second row position and/or a second column position pre-configured in the second decoded block, and
        determining the second edge pixel set according to the second row position and/or the second column position.

6. The method according to claim 1, wherein
    the adjusting the second resolution includes adjusting the second resolution to the first resolution when the target resolution is equal to the first resolution;
    the adjusting the first resolution includes adjusting the first resolution to the second resolution when the target resolution is equal to the second resolution; and
    the adjusting the first resolution includes adjusting the first resolution to a third resolution and the adjusting the second resolution includes adjusting the second resolution to the third resolution when the target resolution is equal to the third resolution, the third resolution being different from the first resolution and the second resolution.

7. The method according to claim 1, wherein
    the adjusting the first resolution includes downsampling the first resolution when the first resolution is greater than the target resolution, and upsampling the first resolution when the first resolution is less than the target resolution; and
    the adjusting the second resolution includes downsampling the second resolution when the second resolution is greater than the target resolution, and upsampling the second resolution when the second resolution is less than the target resolution.

8. A non-transitory computer-readable storage medium storing instructions which when executed by one or more processors cause the one or more processors to perform the video processing method according to claim 1.

9. A video processing method, the method comprising:
determining at least one pair of encoded blocks to be reconstructed in a video frame, each pair of encoded blocks in the at least one pair of encoded blocks including a first encoded block of a first resolution and a second encoded block of a second resolution, the first encoded block being adjacent to the second encoded block;
adjusting the first resolution of the first encoded block to a target resolution;
adjusting the second resolution of the second encoded block to the target resolution;
determining a first edge pixel set in the first encoded block;
determining a second edge pixel set in the second encoded block, the second edge pixel set being adjacent to the first edge pixel set; and
filtering, by processing circuitry, the first edge pixel set and the second edge pixel set.

10. The method according to claim 9, wherein the filtering comprises:
determining first reference pixels associated with the first edge pixel set in the first encoded block;
determining second reference pixels associated with the second edge pixel set in the second encoded block; and
filtering the first edge pixel set and the second edge pixel set according to pixel values of the first reference pixels and pixel values of the second reference pixels, a first difference between a pixel value of an $i^{th}$ pixel in the filtered first edge pixel set and a pixel value of a $j^{th}$ pixel that corresponds to the $i^{th}$ pixel and is in the filtered second edge pixel set being less than a second difference between a pixel value of an $i^{th}$ pixel in the first edge pixel set and a pixel value of a $j^{th}$ pixel in the second edge pixel set, i being a positive integer that is less than or equal to a total quantity of pixels in the first edge pixel set, j being a positive integer that is less than or equal to a total quantity of pixels in the second edge pixel set.

11. The method according to claim 10, wherein the filtering comprises:
determining edge pixels in the first edge pixel set and the second edge pixel set; and
for each of the edge pixels,
performing a weighted summation on the pixel values of the first reference pixels and the pixel values of the second reference pixels to obtain a target pixel value of the respective edge pixel; and
updating a pixel value of the respective edge pixel to the target pixel value of the respective edge pixel to obtain a filtered respective edge pixel.

12. The method according to claim 11, wherein the performing the weighted summation comprises:
determining a position of the respective edge pixel;
obtaining a distance between a position of each reference pixel in the first reference pixels and the second reference pixels and the position of the respective edge pixel;
determining a weight for each reference pixel according to the distance from the position of the respective edge pixel; and
performing the weighted summation on the pixel values of the first reference pixels and the pixel values of the second reference pixels by using the weights, to obtain the target pixel value of the respective edge pixel.

13. A non-transitory computer-readable storage medium storing instructions which when executed by one or more processors cause the one or more processors to perform the video processing method according to claim 9.

14. A video processing apparatus, comprising:
processing circuitry configured to:
determine at least one pair of blocks to be reconstructed in a video frame, each pair of blocks in the at least one pair of blocks including a first block of a first resolution and a second block of a second resolution, the first block being adjacent to the second block;
adjust the first resolution of the first block to a target resolution;
adjust the second resolution of the second block to the target resolution;
determine a first edge pixel set in the first block;
determine a second edge pixel set in the second block, the second edge pixel set being adjacent to the first edge pixel set; and
filter the first edge pixel set and the second edge pixel set.

15. The apparatus according to claim 14, wherein the processing circuitry is further configured to:
determine first reference pixels associated with the first edge pixel set in the first block;
determine second reference pixels associated with the second edge pixel set in the second block; and
filter the first edge pixel set and the second edge pixel set according to pixel values of the first reference pixels and pixel values of the second reference pixels, a first difference between a pixel value of an $i^{th}$ pixel in the filtered first edge pixel set and a pixel value of a $j^{th}$ pixel that corresponds to the $i^{th}$ pixel and is in the filtered second edge pixel set being less than a second difference between a pixel value of an $i^{th}$ pixel in the first edge pixel set and a pixel value of a $j^{th}$ pixel in the second edge pixel set, i being a positive integer that is less than or equal to a total quantity of pixels in the first edge pixel set, j being a positive integer that is less than or equal to a total quantity of pixels in the second edge pixel set.

16. The apparatus according to claim 15, wherein the processing circuitry is further configured to:
determine edge pixels in the first edge pixel set and the second edge pixel set;
for each of the edge pixels,
perform a weighted summation on the pixel values of the first reference pixels and the pixel values of the second reference pixels to obtain a target pixel value of the respective edge pixel; and
updating a pixel value of the respective edge pixel to the target pixel value of the respective edge pixel to obtain a filtered respective edge pixel.

17. The apparatus according to claim 16, wherein the processing circuitry is further configured to:
determine a position of the respective edge pixel;
obtain a distance between a position of each reference pixel in the first reference pixels and the second reference pixels and the position of the respective edge pixel;

determine a weight for each reference pixel according to the distance from the position of the respective edge pixel; and perform the weighted summation on the pixel values of the first reference pixels and the pixel values of the second reference pixels by using the weights, to obtain the target pixel value of the respective edge pixel.

18. The apparatus according claim 14, wherein the processing circuitry is further configured to:

obtain a first row position and/or a first column position pre-configured in the first block and a second row position and/or a second column position pre-configured in the second block; and determine the first edge pixel set according to the first row position and/or the first column position, and determine the second edge pixel set according to the second row position and/or the second column position.

19. The apparatus according to claim 14, wherein the processing circuitry is further configured to:

adjust the second resolution to the first resolution when the target resolution is equal to the first resolution;

adjust the first resolution to the second resolution when the target resolution is equal to the second resolution; and adjust the first resolution to a third resolution and the second resolution to the third resolution when the target resolution is equal to the third resolution, the third resolution being different from the first resolution and the second resolution.

20. The apparatus according to claim 14, wherein the at least one pair of blocks includes one of encoded and decoded blocks.

* * * * *